(12) United States Patent
Liu

(10) Patent No.: US 7,395,071 B2
(45) Date of Patent: Jul. 1, 2008

(54) SYSTEM AND METHOD OF MAKING LOCATION UPDATING MANAGEMENT ON A MOBILE STATION, MOBILE STATION AND MOBILE NETWORK

(75) Inventor: Dong Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 10/389,186

(22) Filed: Mar. 14, 2003

(65) Prior Publication Data

US 2003/0224804 A1 Dec. 4, 2003

(30) Foreign Application Priority Data

Mar. 15, 2002 (CN) .................................. 02 1 07559

(51) Int. Cl.
*H04Q 7/20* (2006.01)
*H04M 3/42* (2006.01)
(52) U.S. Cl. .................. 455/456.1; 455/414.1; 455/435
(58) Field of Classification Search .............. 455/456.1, 455/456, 435, 414.1
See application file for complete search history.

(56) References Cited

U.S. PATENT DOCUMENTS

| | | | | |
|---|---|---|---|---|
| 5,572,221 | A * | 11/1996 | Marlevi et al. ............... | 342/452 |
| 6,169,899 | B1 * | 1/2001 | Havinis et al. ............... | 455/433 |
| 2002/0111172 | A1 * | 8/2002 | DeWolf et al. ............... | 455/456 |
| 2002/0155844 | A1 * | 10/2002 | Rankin et al. ............... | 455/456 |
| 2003/0146871 | A1 * | 8/2003 | Karr et al. .................... | 342/457 |
| 2005/0075119 | A1 * | 4/2005 | Sheha et al. ............. | 455/456.6 |

FOREIGN PATENT DOCUMENTS

WO          WO 99/59369          * 11/1999

* cited by examiner

*Primary Examiner*—William J Deane
(74) *Attorney, Agent, or Firm*—F.Chau & Associates, LLC

(57) ABSTRACT

The invention provides a system and method for location management in a mobile network through sharing individual mobility model between a mobile station and the mobile network. The mobile station and the mobile network always exchange large amounts of data in order to make location updating management in the conventional way, which in turn results in an increase in the overall network overhead and wastes the network resource. The system and method of the invention makes location management in both the mobile station and the mobile network by sharing the mobility model reflecting the action regulation of the mobile station between the mobile station and the mobile network, such that the network overhead is greatly reduce.

19 Claims, 8 Drawing Sheets

SYSTEM AND METHOD OF MAKING LOCATION UPDATING MANAGEMENT ON A MOBILE STATION, MOBILE STATION AND MOBILE NETWORK

TECHNICAL FIELD OF THE INVENTION

The present invention relates to mobile communication, and in particular to a system and method of making location updating management on a mobile station by sharing individual mobility model between the mobile station and a mobile network. The invention also relates to a mobile station and a mobile network.

BACKGROUND OF THE INVENTION

It is important for a mobile network to govern the current location of a mobile station, in order to provide prompt service for the mobile station. In this way, the mobile network can rapidly determine the location of the mobile station, set up the connection and transfer information to/from the mobile station, when there is information such as call or short message to be sent to the mobile station or when the mobile station sends out information. A mobile station may be moving while it is engaged in a communication or in an idle state. To ensure the continuity of an already initiated connection, the mobile station is handed over between the access points. When a mobile station is not engaged in a communication, the network must be able to determine its current cell in order to setup and route an incoming connection.

Location management in current mobile network such as GSM is carried out by two basic operations: paging and location updating. At the radio link level, paging refers to that procedure whereby the network searches for the exact cell through which a mobile station can be reached. This is done by sending out polling signals through all the candidate base stations. If paging is successful, the mobile station will send a paging response to the base station through which the mobile terminated connection can be set up. Location updating refers to that procedure whereby the mobile updates the stored current location and informs the network about its current location when the current location of the mobile station is not consistence with that stored inside the mobile station, so the current location of the mobile station can be managed by the mobile network and an exhaustive search through all possible base stations can be avoided.

FIG. 1 shows the paging and the location updating procedure implemented in a GSM network. Similar approaches are also employed in other mobile networks. With the conventional location management strategy, the network coverage area is divided into smaller cell cluster called Location Areas (LA). A location area is the granularity at which the network keeps track of the locations of the mobile stations, i.e., a location area is that group of cells in which the mobile station must be located. When a mobile station moves from one location area to another, a location updating procedure is triggered and the mobile station informs the network about this change of location area.

To enable the mobile station to detect a change of location area, the base stations periodically broadcast the identifiers of the location area they belong to; the identifier is called the location area identifier (LAI). On the other side, the mobile station 'listens' to the LAI currently being broadcasted and compares it to a recorded LAI (the LAI where it was last located). If the two LAIs are identical, the mobile station does not do any work. However, if the two lAIs are different, the mobile station interprets this as a change of location area, a location updating procedure is triggered and the old LAI is replaced with the new one. At the same time, the mobile station notifies the mobile network the change of its LAI. The mobile network processes the updating procedure on its side in response to receiving the notification, so as to promptly manage the current location of the mobile station.

In the conventional location updating management mechanism, a base station continuously broadcasts the LAI of the location area it belongs to, while a mobile station continuously 'listens' to the broadcasted LAI, and compares it to the registered one. If the two lAIs are different, the mobile station notifies the mobile network the change of its LAI. The mobile network processes the updating procedure on its side, in response to receiving the notification. Then the problem is raised that the overhead of the network increases very much and the network resource is wasted. Furthermore, the power of the mobile station is consumed very quickly because of continuously transmitting signals from the mobile station to the mobile network.

In practice, the activities of many users of mobile stations can be modeled. For instance, quite a number of office workers go to the offices in the morning, stay there for 9 hours, and go back to home. Thus, the location updating process can be done at specific switching points, such as at the points when the user arrives at the offices and when he/she arrives at home, if the mobile network knows about the mobility pattern of a mobile user. In this way, the continuous information exchange between a mobile station and a mobile network is avoided. The information exchanged between the mobile station and the mobile network is reduced then, the location updating process in the system and the process in the mobile station are simplified.

Research already shows that using mobility model of individual user can increase the efficacy of location management. But all proposed methods store and use the mobility model on the mobile network side with little participation of mobile stations, except for them to know location area and compare old and new location areas. Amount of other work is done on the mobile network side.

The mobile station is becoming more powerful with the development of the technique of the embedded microprocessor and storage. Many processes done in the mobile network, in turn, can be done in the mobile station. In addition, a mobile station can locate itself through GPS (Global Positioning System), the LAI received from the mobile network or their combination.

SUMMARY OF THE INVENTION

The invention is raised to solve the above problems. One object of the invention is to provide a system and method of making location updating management on a mobile station by sharing individual mobility model between a mobile station and a mobile network, and a mobile station and a mobile network using the individual mobility model, so as to efficiently reduce the overhead of the network and leverage the powerful calculation and storage capacity of the mobile station.

The object is achieved by providing a system for making location updating management on a plurality of mobile stations in a mobile network, wherein the plurality of mobile stations each comprising: a transceiver for transmitting or receiving location management information to/from the mobile network; mobility model storage means for storing one or more mobility models corresponding to the activities of the mobile station; mobility model selection means connected to the transceiver and the mobility model storage means, for selecting one mobility model from the stored mobility models based on a predefined selection priority and a current location of the mobile station; mobility model computation means connected to the mobility model selection means and the mobility model storage means, for making location updating management on the mobile station based on the mobility model selected by the mobility model selection means; location information storage means connected to the mobility model computation means, for storing the location information of the mobile station. The mobile network comprising: a transceiver for transmitting or receiving location management information to/from the mobile stations; mobility model storage means for storing mobility models with respect to all the mobile stations; mobility model selection means for selecting corresponding mobility model for the individual mobile station from the mobility model storage means based on the mobility model information currently being used by individual mobile station received by the transceiver; mobility model computation means for determining the location of the mobile station based on the mobility model currently used by the mobile station obtained from the mobility model selection means.

In the system according to the invention, the mobile stations each further comprising: current location determination means for determining the current location of the mobile station; comparison means for determining whether a new mobility model needs to be selected by comparing the current location determined by the current location determination means with the location information computed by the selected mobility model, and for instructing the mobility model selection means to select a new mobility model for the mobile station when a new mobility model needs to be selected; the mobility model selection means in the mobile station is further configured to seek to select a new different mobility model for the mobile station from the mobility model storage means in the mobile station n, based on the current location and the predefined selection priority, and if a new different mobility model is selected out, the mobility model selection means sends to the mobile network a message as location management information about the change of the new mobility model through the transceiver in the mobile station, and notifies the mobility model computation means in the mobile station to use the newly selected mobility model to continue the processing of the location updating on the mobile station, and if no new different mobility model is selected out, the mobility model selection means sends to the mobile network a message as location management information through the transceiver in the mobile station that mobility model will not be used in making the location management, the mobile network further comprising: detection means for detecting whether the mobile station uses a mobility model to make the location updating management thereof, and for sending the mobility model identification information of the mobility model used by the mobile station to the mobility model selection means in the mobile network when it detects that a mobile station uses a mobility model to make the location updating management.

In the system according to the invention, the mobile stations and the mobile network each further comprising location information updating means for making the location information updating management on the mobile station without using mobility model, the mobility model selection means in each of the mobile stations is further configured such that if no mobility model is selected out, the mobility model selection means notifies the location information updating means in the mobile station to continue the processing of the location updating management on the mobile station, and the detection means in the mobile network is further configured such that if the detection means detects that no mobility model is used by a mobile station, it notifies the location information updating means in the mobile network to continue the processing of the location updating on the mobile station.

The present invention further provides a mobile station, comprising: a transceiver for transmitting or receiving location management information to/from a mobile network; mobility model storage means for storing one or more mobility models corresponding to the activities of the mobile station; mobility model selection means connected to the transceiver and the mobility model storage means, for selecting one mobility model from the stored mobility models based on a predefined selection priority and a current location of the mobile station; mobility model computation means connected to the mobility model selection means and the mobility model storage means, for making location updating management on the mobile station based on the mobility model selected by the mobility model selection means; location information storage means connected to the mobility model computation means, for storing the location information of the mobile station.

The mobile station according to the invention further comprises: current location determination means for determining the current location of the mobile station; comparison means for determining whether a new mobility model needs to be selected by comparing the current location determined by the current location determination means with the location computed by the selected mobility model, and for instructing the mobility model selection means to select a new mobility model for the mobile station when a new mobility model needs to be selected; the mobility model selection means is further configured to, in response to an instruction from the comparison means, seek to select a new different mobility model for the mobile station from the mobility model storage means, based on the current location and the predefined selection priority, and if a new different mobility model is selected out, the mobility model selection means sends to the mobile network a message as location management information about the change of the mobility model as location management information through the transceiver, and notifies the mobility model computation means to use the new selected mobility model to continue the processing of the location updating on the mobile station, and if no new different mobility model is selected out, the mobility model selection means sends to the mobile network a message as location management information through the transceiver.

The mobile station according to the invention further comprises location information updating means for making the location information updating management on the mobile station without using mobility model, the mobility model selection means is further configured such that if no mobility model is selected out, the mobility model selection means notifies the location information updating means to continue the processing of the location updating on the mobile station;

The present invention provides a mobile network for making location management on a plurality of mobile stations, wherein the mobile network comprising: a transceiver for transmitting or receiving location management information to/from the plurality of mobile stations; mobility model storage means for storing mobility models with respect to the mobile stations; mobility model selection means for selecting corresponding mobility model for the individual mobile station from the mobility model storage means based on the mobility model information currently being used by individual mobile station received by the transceiver; mobility model computation means for determining the location of the mobile station based on the mobility model currently being used by the individual mobile station obtained from the mobility model selection means.

The mobile network according to the invention further comprises: detection means for detecting whether the mobile station uses a mobility model to make the location updating management thereof, and for sending the mobility model identification information of the mobility model used by the mobile station to the mobility model selection means in the mobile network when it detects that the mobile station uses a mobility model to make the location updating management.

The mobile network according to the invention further comprises: location information updating means for making the location information updating management on the mobile station without using mobility model. The detection means in the mobile network is further configured such that if no mobility model is used by a mobile station, the detection means notifies the location information updating means in the mobile network to continue the processing of the location updating on the mobile station.

The present invention provides a method for making location management on a plurality of mobile stations in a mobile network, wherein the method comprising the steps of: storing one or more mobility models corresponding to the activities of the mobile station in each of the mobile stations; storing mobility models used by the mobile stations in the mobile network; each of the mobile stations automatically making its own location updating management by using one of the mobility models stored in the mobile station itself; the mobile network automatically making the location updating management on the mobile stations based on the mobility models currently being used by themselves, respectively.

The method according to the invention further comprises the steps of: the mobile station determines whether there exists a new different mobility model which can be used to continue the processing of the location updating on the mobile station, when it detects that the current location of the mobile station goes beyond the government scope of the mobility model; the mobile station uses the new different mobility model to continue the processing of the location updating on the mobile station and notifies the mobile network about the new different mobility model, when a new different mobility model exists, and the mobile network uses the new different mobility model to continue the processing of the location updating on the mobile station, The mobile station notifies the mobile network to abandon making the location updating management on the mobile station based on the mobility model, when no new different mobility model exists.

The object and the advantage of the invention will be more apparent by reference to the preferred embodiments in accompanying with the drawings.

DETAILED DESCRIPTION OF THE INVENTION

Figure 1:
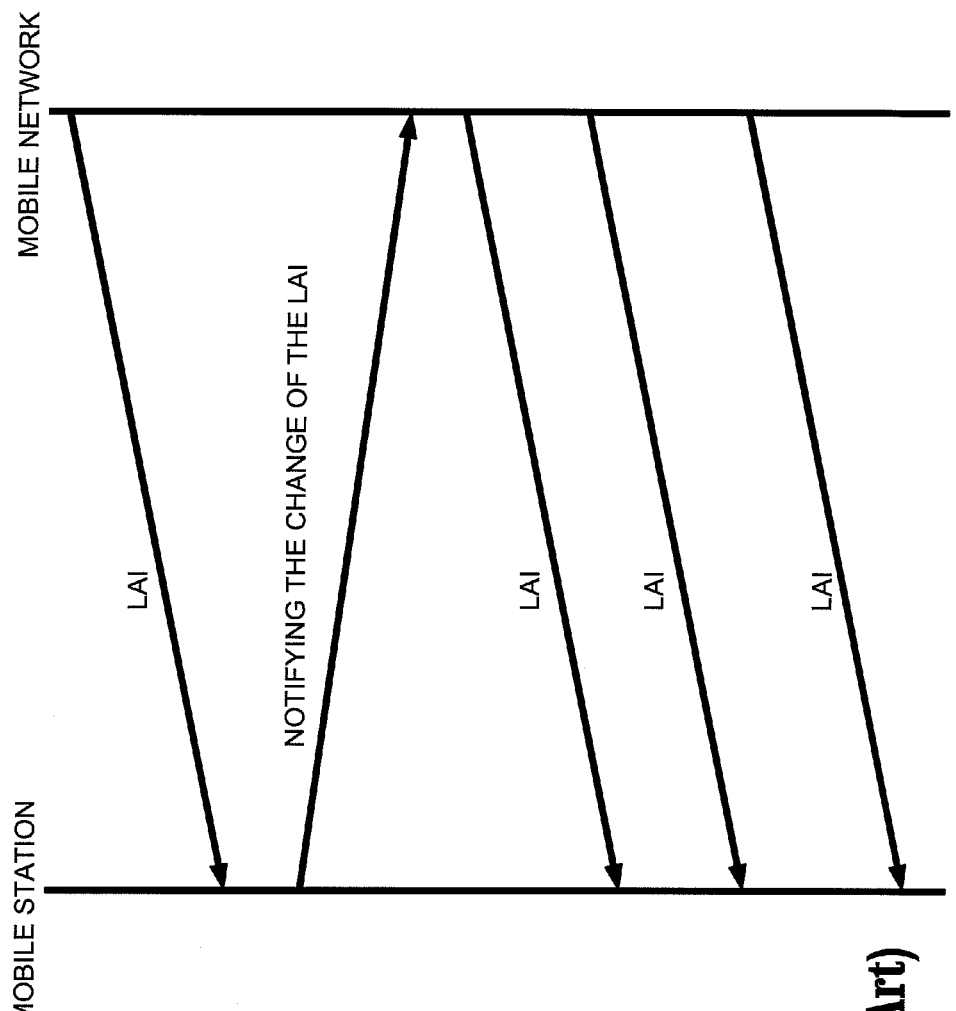
FIG. 1 is a diagram showing a location management process in conventional way.
Figure 2:
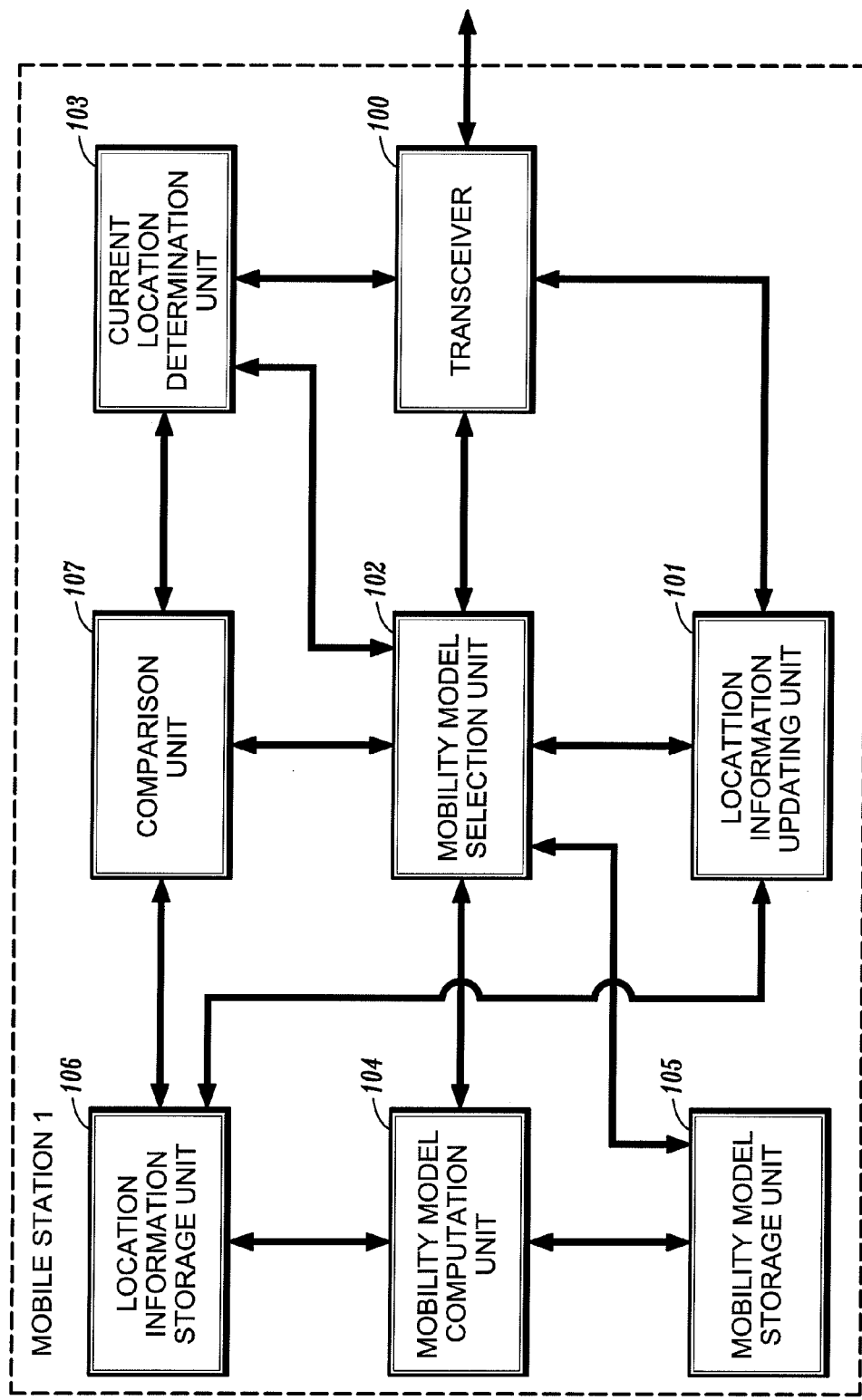
FIG. 2 is a functional block diagram of the location management system on the mobile station side according to the invention.

FIG. 2 is a functional block diagram of the location management system on the mobile station side according to the invention.

As shown in FIG. 2, the mobile station 1 comprises a transceiver 100, a location information updating unit 101, a mobility model selection unit 102, a current location determination unit 103, a mobility model computation unit 104, a mobility model storage unit 105, a location information storage unit 106, and a comparison unit 107.

The mobility model storage unit 105 stores mobility models 1 to N capable of being used by the mobile station 1. With the development of the data processing technique such as data mining method, it is already possible to generate the mobility model reflecting the activity of the user of a mobile station by statistically analyzing the history data about location updating of the mobile station on the mobile network side. And it is also possible to make the location management on the mobile station by using mobility model on the mobile network side. And then the detailed explanation on how to establish a mobility model will be omitted.

The mobility models 1 to N may be input through an input unit (now shown) of the mobile station 1 by a user, or selected from the optional models provided by the mobile network or certain mobile station manufacturer, or their combination. If the mobility models are provided from the mobile network 2, the transceiver 100 in the mobile station 1 downloads the mobility models from the mobile network 2, and stores them in the mobility model storage unit 105. The downloading procedure is not necessary if the mobility models are previously stored in the mobile stations 1. It will be understandable for persons skilled in the art that the downloading and the storing procedure may be executed once for all without being executed every time the mobile station is powered on, so that the downloaded models are permanently stored in the mobile station for being used in the future. When a new mobility model is provided by the mobile network or when the mobile station 1 wishes to download a new mobility model, the downloading procedure may be executed again.

Each of the mobility models 1 to N capable of being used by the mobile station 1 calculates the location where the mobile station should be at certain time, based on the mobility algorithm included in the mobility model; determines the time point when the location updating management need to be executed for the mobile station, based on the calculated location information and the location information stored in the mobile station; and automatically updates the stored location information with the calculated location information at the time point, so that the mobile station always maintains the newest location information.

According to the invention, if the activities of the user of the mobile station using mobility models are regular (for example, the user is an office man or lady), the mobile station may execute location management merely based on a mobility model and automatically update the location information maintained in the mobile station. In this case, the mobile station rarely exchanges location management information with the mobile network. On the mobile network side, the newest current location information about the mobile station is also automatically updated by using the mobility model identical to that in the mobile station, so that the mobile network rarely exchanges location management information with the mobile station. According to the invention, the information exchanged between the mobile station and the mobile network is sharply reduced so that the overhead of the network greatly decreases.

The following is an example of a simple mobility model:
From Monday to Friday
7:00-8:00 AM on the way from home to office (route ab, average speed x)
8:00-5:00 PM stay in office which is covered by BSi
5:00-6:00 PM on the way back home (route ba, average speed x)
6:00-7:00 AM next day around home area which is covered by BSj
Saturday and Sunday
No specific model It will be understandable for persons skilled in the art that the mobility model may be expressed in mathematic function, or be expressed in one or more rules reflecting the activity of the mobile station, or in any other manners that may reflect the activity regularity of the user with the time lapse. It will also be understandable for persons skilled in the art that the mobility model may be presented in a software program.

The transceiver 100 transmits and receives location management information to/from the mobile network 2.

The mobility model selection unit 102 selects one mobility model from the mobility model storage unit 105 based on a predefined selection priority and the current location CL of the mobile station, the selected mobility model being the most appropriate model to make the location management on the mobile station currently. The mobility model selection unit 102 then sends the identification number (for example, the number of the mobility model) of the selected mobility model to the mobile network 2 via the transceiver 100. The mobility model selection unit 102 identifies the selected mobility model as the currently active model and sends the identification number thereof to the mobility model computation unit 104. If the mobility model selection unit 102 detects that no appropriate mobility model may cover the current activity of the mobile station, it notifies the location information updating unit 101 as well as the mobile network 2 a message that no mobility model is selected out. The location information updating unit 101 and the mobile network 2, after receiving this message, will make the location updating management in conventional way. It will be understandable for persons skilled in the art that the location information updating unit 101 may be implemented by the technique described in the background of the invention or other technique for implementing the location management in conventional way.

The mobility model computation unit 104 calls from the mobility model storage unit 105 the mobility model selected by the mobility model selection unit 102. The selected mobility model is used to make the location updating management on the mobile station. The selected mobility model calculates the model location by using a model algorithm or rules included therein, and executes the local location updating procedure when it is necessary to update the location information stored in the mobile station. The local location updating procedure will be described hereinbelow.

The location information storage unit 106 stores the most current location information of the mobile station. The location information is changed when the location of the mobile station is changed, so that the most current location information of the mobile station is maintained. The mobile station may obtain its location information by receiving the LAI from the mobile network when the mobile station is powered on, or through a self-positioning device housing in the mobile station, or by executing the local location updating procedure through the selected model, or by triggering a system location updating procedure as described hereinbelow. The location may be a logical location information such as a LAI or any other logic logical location capable of being addressed by the mobile network such as a cell location, or an absolute location information obtained from a self-positioning device. The location information may be in any type, so long as it is capable of being used by the mobile model to make the calculation, used by the comparison unit to make the comparison, and used by the mobility network to make the location determination.

The current location determination unit 103 determines the concretely current location CL where the mobile station 1 is now located. The current location determination unit 103 may determine the current location CL of the mobile station by using the LAI received by the transceiver 100, or by using a self-positioning device such as a GPS system. Thus, the location information CL may be logical location information such as a LAI or any other logic location capable of being addressed by the mobile network such as a cell location, or absolute location information obtained from the self-positioning device.

The comparison unit 107 compares the current location CL determined by the current location determination unit 103 to the location information calculated by the selected mobility model, and calculates the difference therebetween based on the formula:

=|the current location CL−calculated location information|

When the difference is within the tolerance range, for example, when the difference is no more than a predefined reference value, it means the mobility state of the mobile station 1 is under the management of the active mobility model (i.e., the selected mobility model). The tolerance range of the difference is relative to the mobility model. When the difference is more than the reference value, it means the mobility state of the mobile station 1 has gone beyond the management of the active mobility model. The comparison unit 107 then notifies a message that the difference has gone beyond the tolerance range to the mobility model selection unit 102, which then processes further determination. The further process about the determination will be described hereinbelow. It will be understandable for persons skilled in the art that, the comparison may compare the current location CL determined by the current location determination unit 103 to the location information calculated by the selected mobility model in other way, so long as it can determine whether or not the mobility state of the mobile station 1 is under the management of the active mobility model.

Figure 3:
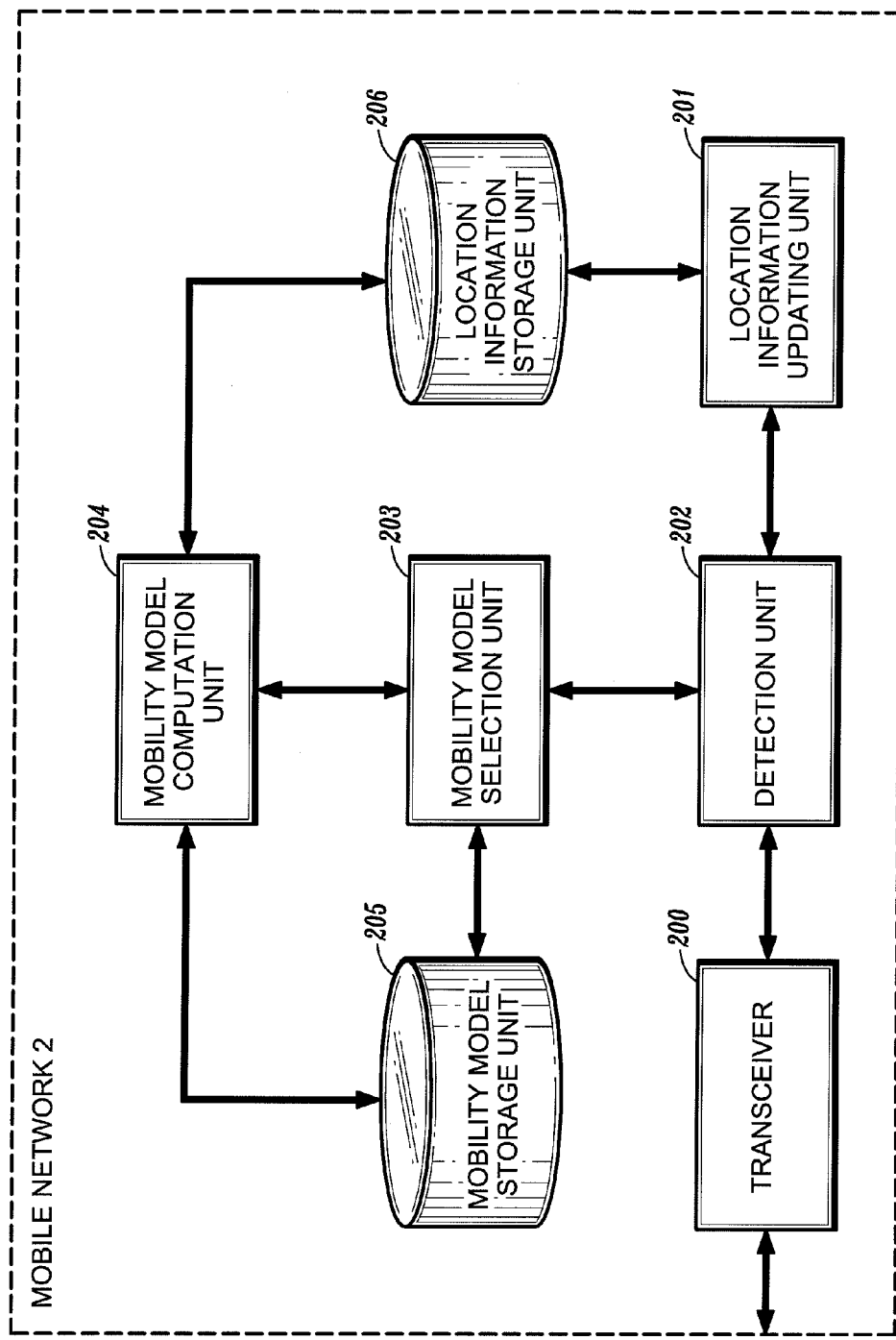
FIG. 3 is a functional block diagram of the location management system on the mobile network side according to the invention.

FIG. 3 is a functional block diagram of the location management system on the mobile network side according to the invention.

On the mobile network 2 side, a transceiver 200, a location information updating unit 201, a detection unit 202, a mobility model selection unit 203, a mobility model computation unit 204, a mobility model storage unit 205, and a location information storage unit 206 are configured, corresponding to the mobile station side.

The mobility model storage unit 205 stores all the mobility models 1 to M (M N) capable of being used by the mobile stations connected to the mobile network. It is possible to upload the mobility models 1 to M from the mobile users to the mobile network through the mobile stations. And it is possible to generate the mobility models reflecting the activity of the users of the mobile stations by statistically analyzing the history location updating data of the mobile station on the mobile network side or by the mobile station manufacturer.

The location information storage unit 206 on the mobile network side stores all the current location information of all the mobile stations connected to the mobile network.

The transceiver 200 in the mobile network 2 transmits or receives location management information to/from the transceiver 100 in the mobile station 1.

The detection unit 202 receives the location management information sent from the mobile station, and detects whether or not the mobile station uses a mobility model to make the location updating management based on the received information.

The location information updating unit 201 in the mobile network 2 coordinates with the location information updating unit 101 in the mobile station 1 to make the location updating management in the conventional way.

In addition, the mobility model selection unit 203 and the mobility model computation unit 204 on the mobile network 2 side are identical to the mobility model selection unit 102 and the mobility model computation unit 104 on the mobile station 1 side, respectively. And the description thereof is omitted.

The location updating procedure according to the invention will be described in details.

The mobility model initiation procedure will be described firstly.

Figure 4:
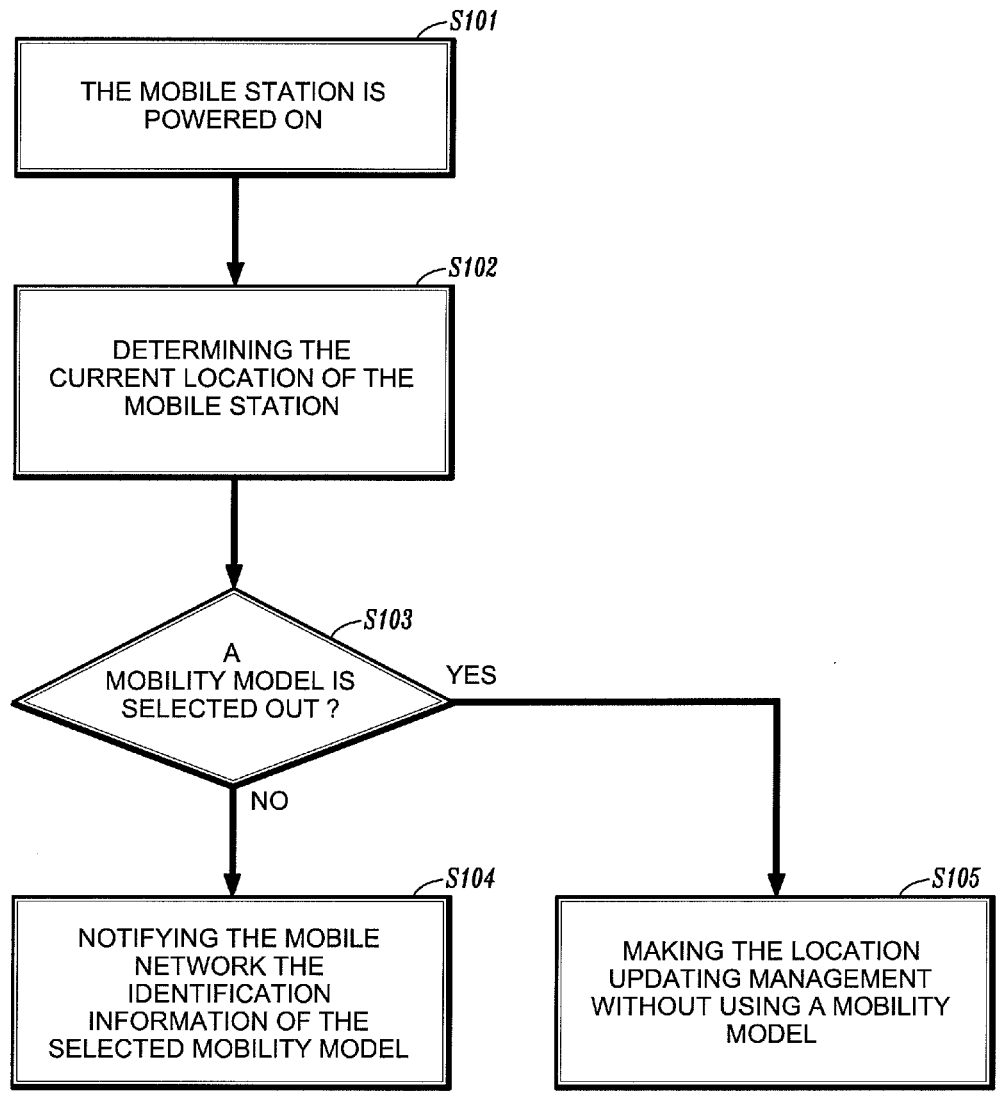
FIG. 4 is a flow chart showing a procedure of initiating a mobility model.

FIG. 4 is a flow chart showing a procedure of initiating a mobility model.

After the mobile station 1 is powered on (S101), the current location determination unit 103 determines the current location CL where the mobile station 1 is now located, and supplies the current location CL to the mobility model selection unit 102 (S102). The mobility model selection unit 102 seeks to select one mobility model appropriate to manage the mobile station from the mobility model storage unit 105, based on a predefined selection priority and the current location CL of the mobile station (S103). The priority may be set, for example, by the mobile network 1 by analyzing the history location updating records of the mobile station 1, or by the user of the mobile station 1 based on his/her activity regularity. The mobility model reflecting the user's activity regularity the most is entitled to the highest priority. If a mobile model is selected out, the mobility model selection unit 102 notifies the mobile network 2 through the transceiver 100 the identification information of the selected mobility model (S104). If no mobile model is selected out, the mobility model selection unit 102 notifies the mobile network 2 through the transceiver 100 the message that mobility model will not be used in making the location management (S105). In the latter case, the location information updating unit 101 processes the location management in the conventional way.

The local location updating management procedure will now be described, in which the mobility model computation unit 104 makes the location management on the mobile station by using a mobility model.

Figure 5:
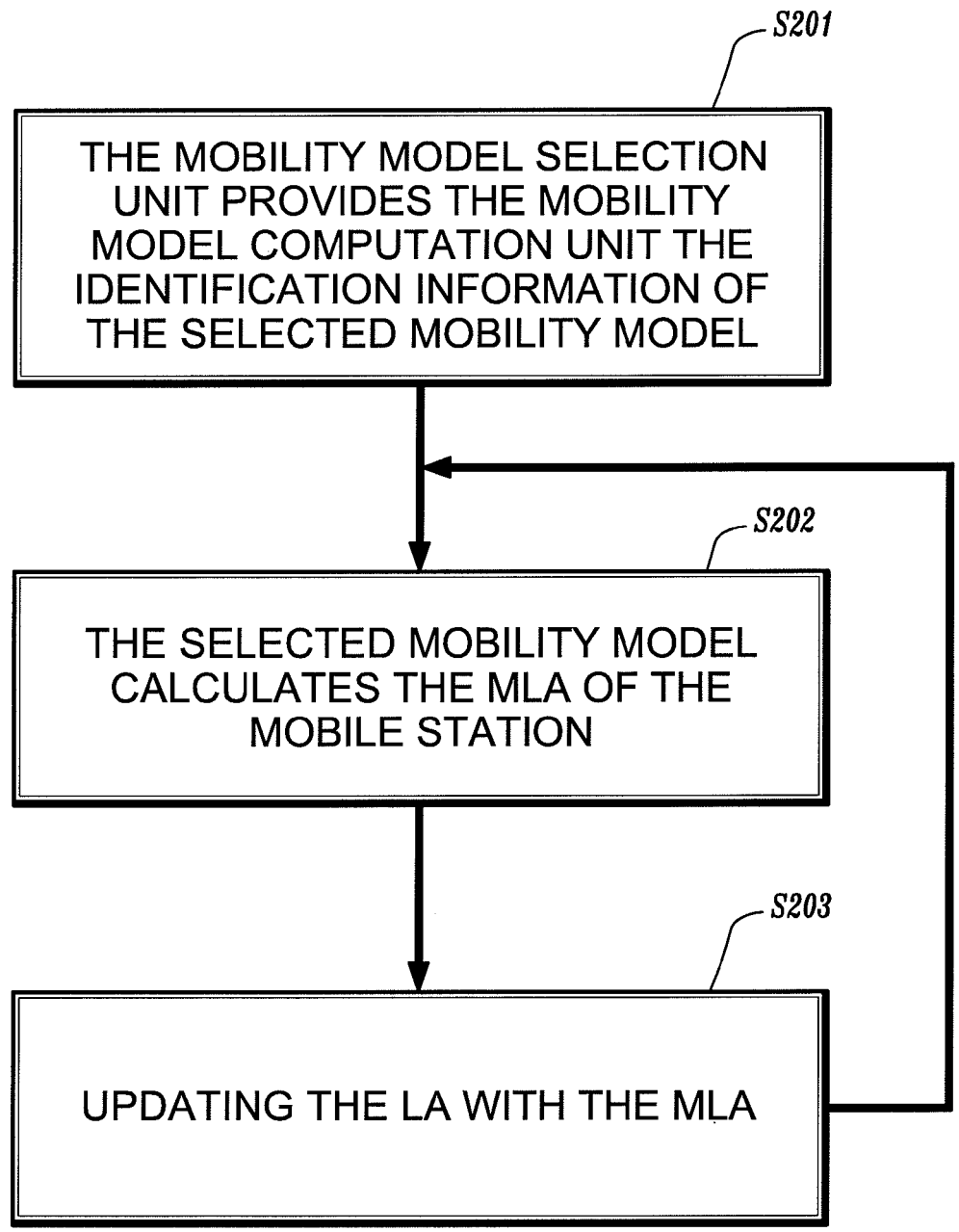
FIG. 5 is a flow chart showing a procedure of making locally location updating management based on a mobility model on the mobile station side.

FIG. 5 is a flow chart showing a procedure of making locally location updating management.

After the initiating of the mobility model, the mobility model selection unit 102 supplies the mobility model computation unit 104 the identification information of the selected mobility model and the current location CL (S201). The mobility model computation unit 104 stores the current location CL, as the location information of the mobile station 1, in the location information storage unit 106. And the mobility model computation unit 104 then calls the corresponding mobility model from the mobility model storage unit 106, and commits the local location management on the mobile station 1 to the selected mobility model. The selected mobility model calculates the location information where the mobile station should be provided that the mobile station 1 acts like the way defined in the mobility model (S202). And then the mobility model updates the content LA stored in the location information storage unit 106 with the calculated location information (S203). The process returns to step S202 to continue. The above procedure is based on the presumption that the mobile station 1 acts completely in the way reflected by the selected mobile model. In practice, however, the mobility station 1 does not act completely in the way as reflected by the mobility model. The invention then further improves the location management procedure based on the mobility model by adding a comparison process. The location management procedure after adding a comparison process is also called the system location information updating procedure.

Figure 6:
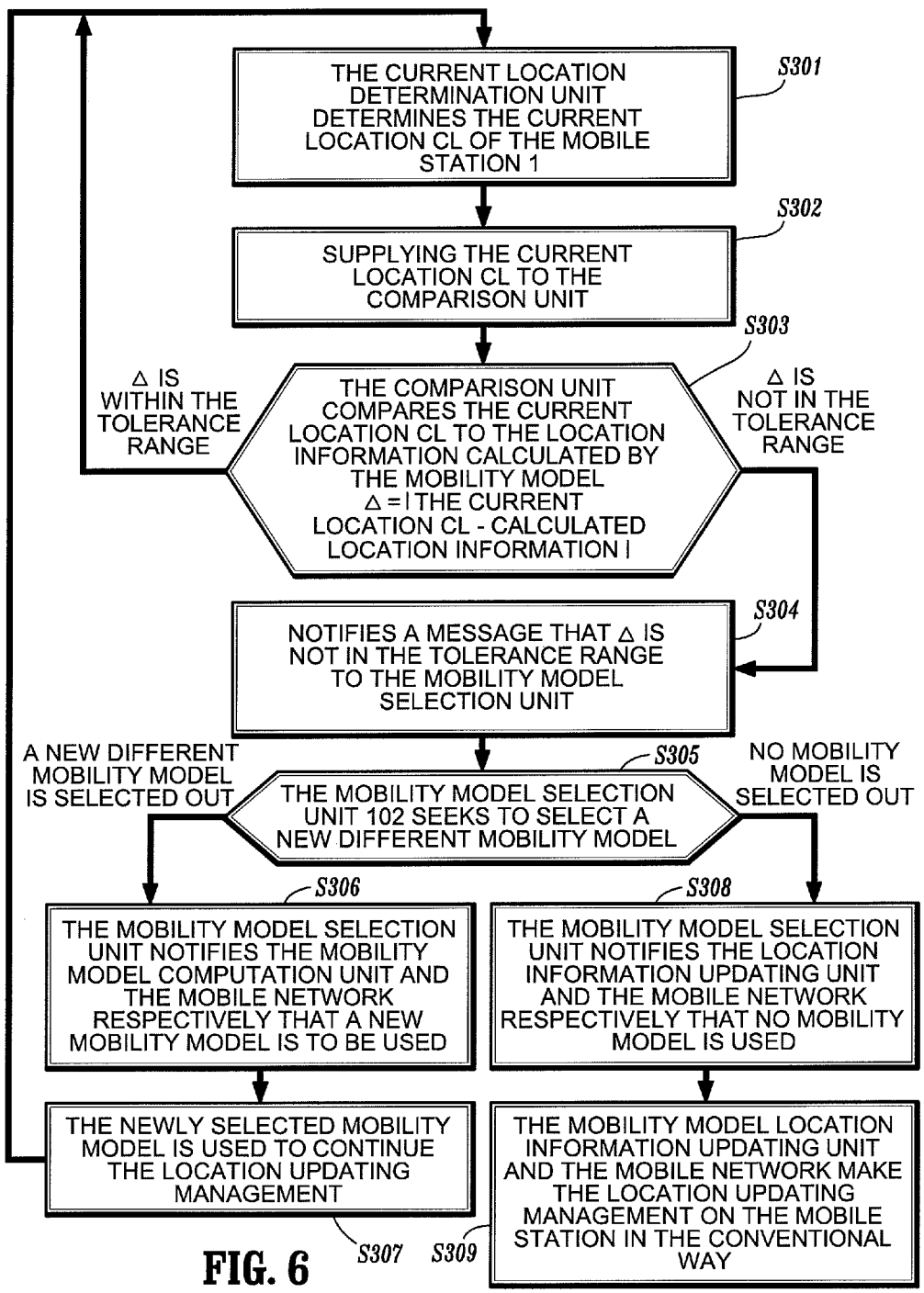
FIG. 6 is a flow chart showing a modified procedure of making location management on the mobile station side.

FIG. 6 is a flow chart showing a modified procedure of making location management by using a mobility model.

First, the current location determination unit 103 in the mobile station 1 determines the location CL where the mobile station 1 is now located (S301).

The current location determination unit 103 supplies the current location CL to the comparison unit 107 (S302).

The comparison unit 107 reads the stored location information from the location information storage unit 106, and compares it to the current location CL (S303). It has been described in the flow chart of FIG. 3, the mobility model stores the calculated location information in the location information storage unit 106, if the location management on the mobile station is managed by the mobility model. In this case, the location information read out by the comparison unit 107 is just the location information calculated by the mobility model. The comparison unit 107 compares the current location CL determined by the current location determination unit 103 to the location information calculated by the selected mobility model, and calculates the difference therebetween based on the formula $$\triangle = |\text{the current location CL} - \text{calculated location information}|$$

When the difference is within the tolerance range, it means the current mobility state of the mobile station 1 is still under the management of the active mobility model (i.e., the selected mobility model). The active mobility model continues the location management on the mobile station. And the process returns to step S301.

When the difference is not in the tolerance range, it means the mobility state of the mobile station 1 has gone beyond the management of the active mobility model. The comparison unit 107 notifies a message that the current mobility model is not suitable for making the location management on the mobile station 1 to the mobility model selection unit 102 (S304).

In response to the notified message, the mobility model selection unit 102 seeks to select a new different mobility model for the mobile station from the mobility model storage unit 105 based on the current location, in the order of the predefined selection priority (S305).

If a new different mobility model is selected out, the mobility model selection unit 102 sends to the mobile network 2 the identification information of the new mobility model through the transceiver 100, and notifies the mobility model computation unit 104 the identification information of the newly selected mobility model and the current location CL (S306).

Then, the mobility model computation unit 104 stores the current location CL, as the location information of the mobile station 1, in the location information storage unit 106. And the mobility model computation unit 104 commits the local location management on the mobile station 1 to the newly selected mobility model (S307).

If no new different mobility model is selected out, The mobility model selection unit 102 notifies the location information updating unit 101 that no mobility model is used, and sends to the mobile network 2 a message as location management information through the transceiver 100 in the mobile station that mobility model will not be used in making the location management (S308).

In response to this notification, the mobility model location information updating unit 101 and the mobile network 2 make the location updating management on the mobile station 1 in the conventional way (S309).

Figure 7:
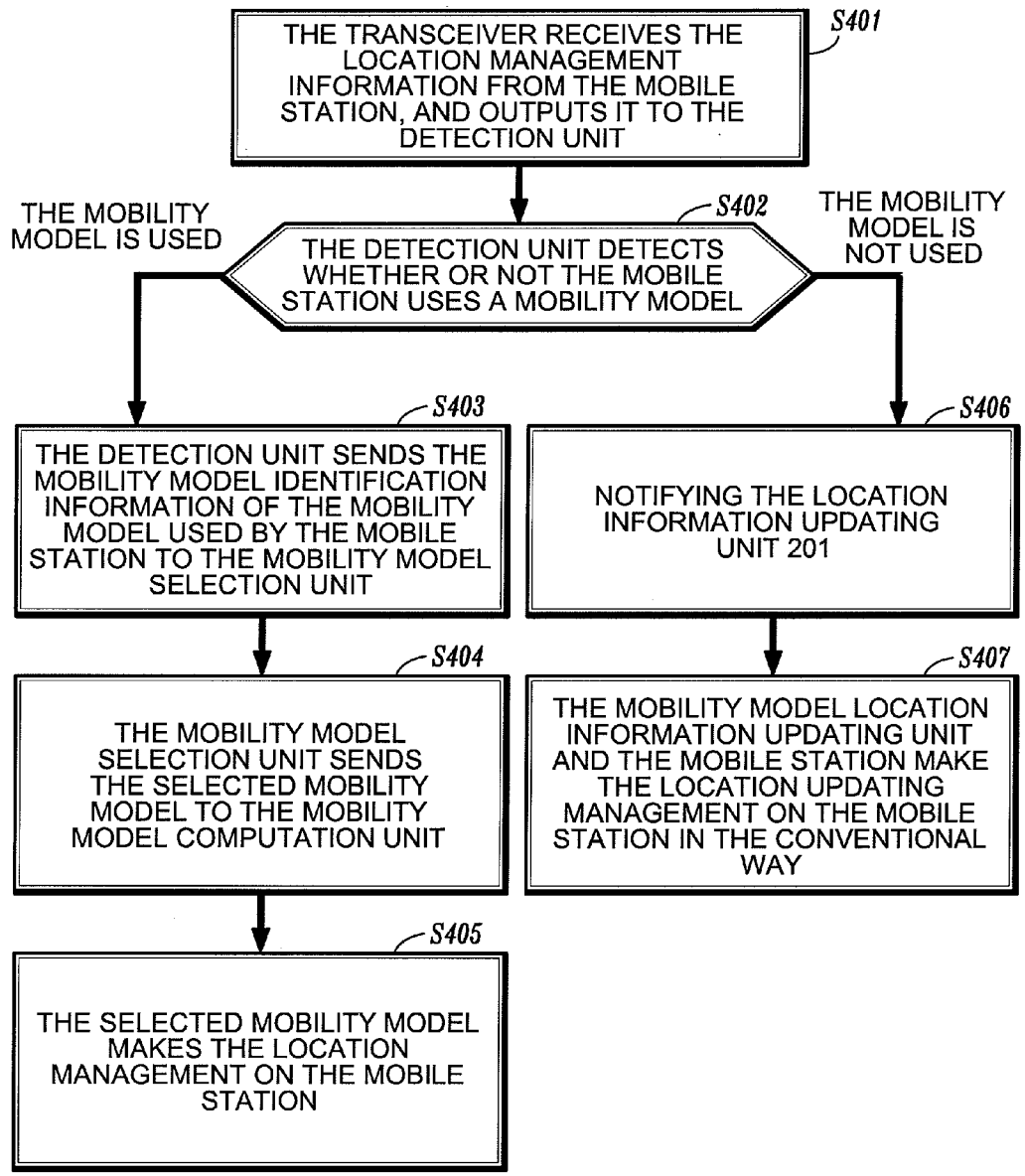
FIG. 7 is a flow chart showing a procedure of making location management on the mobile network side according to the invention.

FIG. 7 is a flow chart showing a procedure of making location management on the mobile network side according to the invention.

Firstly, the transceiver 200 receives the location management information from the mobile station 1, and outputs it to the detection unit 202 (S401).

The detection unit 202 detects whether or not the mobile station 1 uses a mobility model to make the location updating management (S402).

The detection unit 202 sends the mobility model identification information of the mobility model used by the mobile station to the mobility model selection unit 203 (S403) when it detects that a mobile station uses a mobility model to make the location updating management (for example, by detecting whether or not the identification information of the mobility model is received). The mobility model selection unit 203 selects out the mobility model currently used by the mobile station 1 from the mobility model storage unit 204 (S404). The mobility model computation unit 204 then commits the local location management on the mobile station 1 to the selected mobility model (S405). The mobility model in the mobile network and the mobility model in the mobile station consistently make the location management on the mobile station 1 in parallel.

When the detection unit 202 detects that there is no mobility model used by the mobile station 1, it commits the location management to the location information updating unit 201 (S406). The location information updating unit 201 in the mobile network 2 coordinates with the location information updating unit 101 in the mobile station 1 to make the location updating management in the conventional way (S407).

Figure 8:
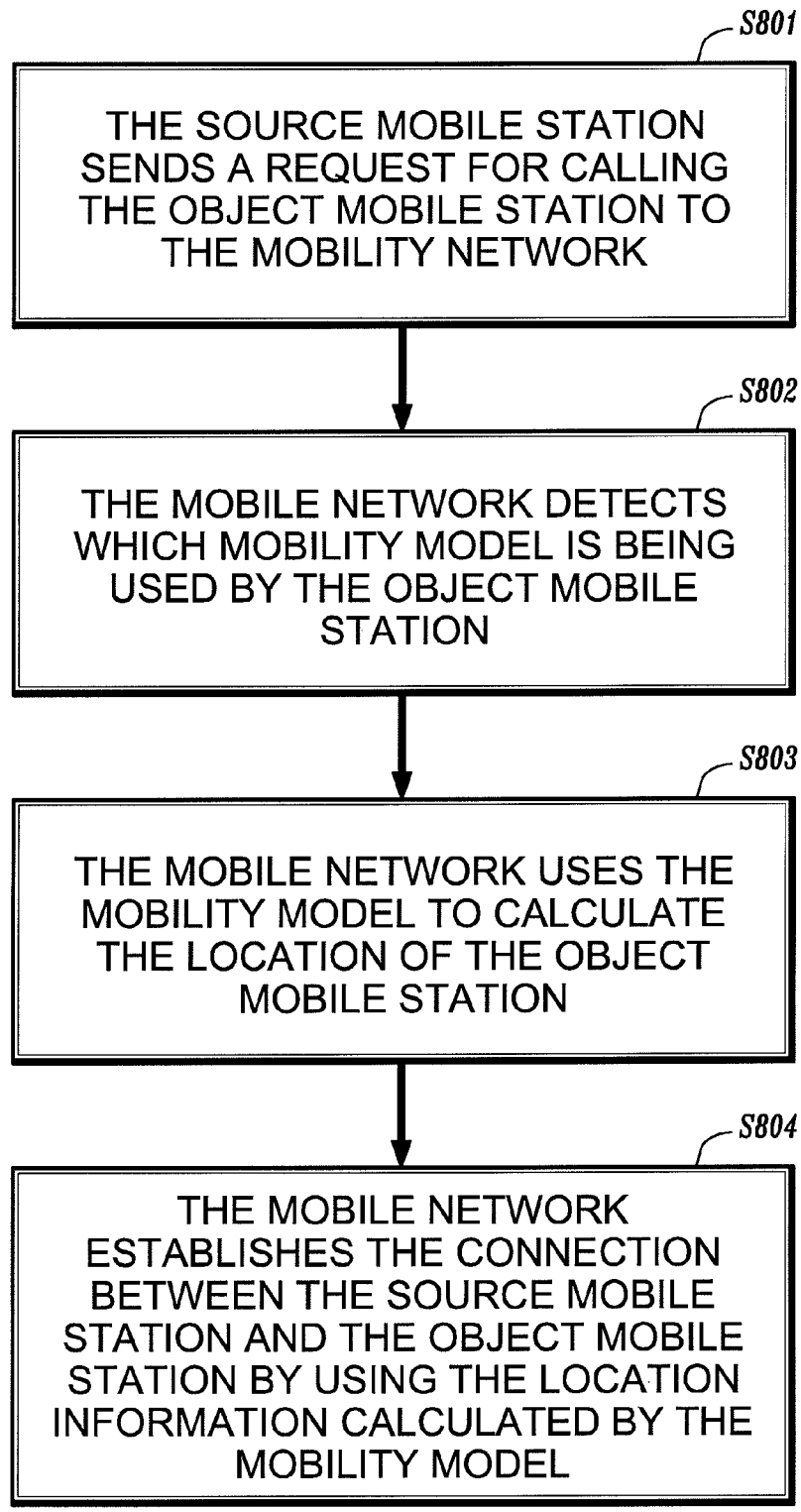
FIG. 8 is a flow chart showing a procedure of setting up a connection between a mobile station and a mobile network through sharing a mobility model.

FIG. 8 is a flow chart showing a procedure of setup a connection between a mobile station and a mobile network through sharing a mobility model. It is supposed that the mobile station B calls the mobile station A, whose location updating management is being managed by the shared mobility model C between the mobile station A and the mobile network.

Firstly, the mobile station B sends a request for calling the mobile station A to the mobility network (S801);

The mobile network detects which mobility model is being used by the mobile station A, in response to this request. In this case, it is mobility model C (S802);

Then, the mobile network calls the mobility model C to calculate the location of the mobile station A (S803);

The mobile network 2 pages the mobile station A by using the location information calculated by the mobility model C so as to establish the connection between the mobile station A and the mobile station B (S804).

In the flow chart of claim 8, the storage device is not used when the mobile network detects the location of the mobile station A. But it is understandable for persons skilled in the art that, the mobile model C may store the promptly calculated location information of the mobile station A in the location information storage unit 206 in advance. And the mobile network may retrieve the location information from the location information storage unit 206 when necessary.

As can be seen from the above description, the invention updates the mobility models stored in the mobile station and the mobile network through exchanging the information between them. And therefore, the storage capability of the mobile station is efficiently used.

Furthermore, the capability of positioning, storing and computing of the mobile station is efficiently used during the location management procedure by using the mobility model.

Moreover, by sharing the above model, the mobile station and the mobile network seldom exchange paging and locating updating information. The mobile station, based on its positioning, computing and storage capacity, knows that its movement is covered by the agreed model, and the network knows how to reach it no matter it is through paging a personalized location area (home area) or contacting a specific base station (office site). Only when the mobile station find that its movement is no longer governed by the model, a general location update is triggered which then might turn mobile station and the network back to the conventional location area based location management method or to try to share a new mobility model. The invention helps the mobile station and the mobile network to further improve the location management function of the mobile network.

Note that the above embodiments are only used to explain the invention, but not to limit the invention.

The invention has been described by reference to the embodiments and the drawings, which are not used to limit the invention. And the invention can be modified and improved without departing the spirit and the scope of the claims.

What is claimed is:

1. A system comprising:
 a plurality of mobile stations; and
 a mobile network,
 wherein each mobile station comprises:
 a transceiver for transmitting or receiving location management information to/from the mobile network;
 a mobility model storage unit for storing one or more mobility models corresponding to activities of a user of the mobile station;
 a mobility model selector, which is connected to the transceiver and the mobility model storage unit, for selecting one mobility model from the stored mobility models based on a predefined selection priority and a current location of the mobile station;
 a mobility model computation unit, which is connected to the mobility model selector and the mobility model storage unit, for managing location information updating on the mobile station based on the mobility model selected by the mobility model selector; and a location information storage unit, which is connected to the mobility model computation unit, for storing location information of the mobile station, wherein the mobile network comprises:

a transceiver for transmitting or receiving location management information to/from the mobile stations;

a mobility model storage unit for storing one or more mobility models corresponding to the one or more mobility models of the mobile stations;

a mobility model selector for selecting a corresponding mobility model from the mobility model storage unit in the mobile network based on a mobility model identification information identifying a mobility model currently being used by a mobile station received by the transceiver in the mobile network;

a mobility model computation unit for determining the current location of the mobile station based on the corresponding mobility model obtained from the mobility model selector in the mobile network.

2. The system according to claim 1, wherein each mobile station further comprises:

current location determination means for determining the current location of the mobile station;

comparison means for comparing the current location determined by the current location determination means with a calculated location information, which is computed by a mobility model, and for instructing the mobility model selector in the mobile station to select a new mobility model for the mobile station if a difference between the current location and the calculated location information is greater than a reference value, wherein the mobility model selector in the mobile station is configured to select the new mobility model for the mobile station from the mobility model storage unit in the mobile station, based on the current location and the predefined selection priority, and if a selection of a new mobility model is made, the mobility model selector in the mobile station sends information about the selection of the new mobility model through the transceiver in the mobile station to the mobile network, and notifies the mobility model computation unit in the mobile station to use the new mobility model in managing location information updating on the mobile station, and if no new mobility model is selected, the mobility model selector in the mobile station sends a message through the transceiver in the mobile station to the mobile network that a mobility model will not be used in managing location information updating on the mobile station, the mobile network further comprising:

detection means for detecting whether the mobile station uses a mobility model in managing location information updating, and for sending the mobility model identification information to the mobility model selector in the mobile network if the detection means detects that a mobile station uses a mobility model in managing location information updating.

3. The system according to claim 2, wherein:

each mobile station further comprises location information updating means for updating location information on the mobile station without using a mobility model, if no mobility model is selected, the mobility model selector in the mobile station notifies the location information updating means in the mobile station to continue updating location information on the mobile station, and if the detection means detects that no mobility model is used by one of the mobile stations, the detection means notifies a location information updating means in the mobile network to continue updating location information on the mobile station.

4. The system according to claim 1, wherein the mobile network further comprises:

a location information storage means, which is connected to the mobility model computation unit in the mobile network, for storing location information of each of the mobile stations.

5. The system according to claim 1, wherein the one or more mobility models stored in the mobility model storage unit in the mobile station are provided by the mobile network or a mobile station provider, or set by a user of the mobile station.

6. The system according to claim 1, further including current location determination means for determining the current location of the mobile station by receiving at the transceiver in the mobile station a location identifier from the transceiver in the mobile network.

7. The system according to claim 6, wherein the current location determination means is a self-locating system.

8. The system according to claim 7, wherein the self-locating system includes a GPS.

9. A mobile station, comprising:

a transceiver for transmitting or receiving location management information to/from a mobile network;

mobility model storage means for storing one or more mobility models corresponding to activities of a user of the mobile station;

mobility model selection means, which is connected to the transceiver and the mobility model storage means, for selecting one mobility model from the stored mobility models based on a predefined selection priority and a current location of the mobile station;

mobility model computation means, which is connected to the mobility model selection means and the mobility model storage means, for managing location information updating on the mobile station based on the mobility model selected by the mobility model selection means;

location information storage means, which is connected to the mobility model computation means, for storing location information of the mobile station.

10. The mobile station according to claim 9, further comprising:

current location determination means for determining the current location of the mobile station;

comparison means for comparing the current location determined by the current location determination means with a calculated location information, which is computed by the mobility model, and for instructing the mobility model selection means to select a new mobility model for the mobile station if a difference between the current location and the calculated location information is greater than a reference value, wherein the mobility model selection means is configured to, in response to an instruction from the comparison means, seek to select a new mobility model from the mobility model storage means based on the current location and the predefined selection priority, and if the new mobility model is selected, the mobility model selection means sends information about the selection of the new mobility model through the transceiver in the mobile station to the mobile network, and notifies the mobility model computation means to use the new mobility model in managing location information updating on the mobile station, and if no new mobility model is selected, the mobility model selection means sends a message through the transceiver in the mobile station to the mobile network that a mobility model will not be used in managing location updating on the mobile station.

11. The mobile station according to claim 10, wherein the mobile station further comprises location information updating means updating location information on the mobile station without using a mobility model, wherein if no mobility model is selected, the mobility model selection means notifies the location information updating means to continue updating location information on the mobile station.

12. A mobile network for location management for a plurality of mobile stations, the mobile network comprises:
   a transceiver for transmitting or receiving location management information to/from the plurality of mobile stations;
   mobility model storage means for storing one or more mobility models corresponding to the one or more mobility models of the mobile stations;
   mobility model selection means for selecting a corresponding mobility model from the mobility model storage means based on a mobility model identification information identifying a mobility model currently being used by a mobile station received by the transceiver;
   mobility model computation means for determining the current location of the mobile station based on the corresponding mobility model obtained from the mobility model selection means; and
   comparison means for comparing the current location determined by the mobility model computation means with a calculated location information, which is computed by a mobility model, and for instructing the mobility model selection means to select a new mobility model for the mobile station if a difference between the current location and the calculated location information is greater than a reference value.

13. The mobile network according to claim 12, wherein the mobile network further comprises:
   detection means for detecting whether the mobile station uses a mobility model to in managing location information updating, and for sending the mobility model identification information of to the mobility model selection means in the mobile network if the detection means detects that the mobile station uses a mobility model in managing location information updating.

14. The mobile network according to claim 13, wherein the mobile network further comprises:
   location information updating means for updating location information on the mobile station without using a mobility model,
   the detection means in the mobile network is further configured such that if no mobility model is used by a mobile station, the detection means notifies the location information updating means in the mobile network to continue updating location information on the mobile station.

15. The mobile network according to claim 12, wherein the mobile network further comprises:
   location information storage means, which is connected to the mobility model computation means, for storing location information of each of the mobile stations.

16. A method for location management on a plurality of mobile stations in a mobile network, comprising:
   storing one or more mobility models corresponding to activities of one or more users of the mobile stations;
   comparing a current location with a calculated location information, which is computed by a mobility model, and instructing a mobility model selector in a mobile station to select a new mobility model for the mobile station if a difference between the current location and the calculated location information is greater than a reference value; and
   storing the one or more mobility models used by the mobile stations in the mobile network, wherein
   each of the mobile stations manages location information updating by using the one or more mobility models stored in the mobile station and
   the mobile network manages location information updating for the mobile stations based on the mobility models currently being used by respective mobile stations.

17. The method according to claim 16, further comprising the steps of:
   determining whether a new mobility model is available which can be used to continue managing location information updating on the mobile station, when it detects that the current location of the mobile station goes beyond a government scope of the mobility model;
   the mobile station uses the new mobility model to continue managing location information updating on the mobile station and notifying the mobile network about the new mobility model, when a new mobility model exists, and the mobile network uses the new mobility model to continue managing the location information updating on the mobile station,
   notifying the mobile network to abandon managing location information updating on the mobile station based on the mobility model, if it is determined that no new mobility model exists.

18. A program storage device having a stored program of instructions executable by a processor to perform method steps for location management of a plurality of mobile stations in a mobile network, the method steps comprising:
   storing one or more mobility models corresponding to activities of one or more users of the mobile stations;
   comparing a current location with a calculated location information, which is computed by a mobility model, and instructing a mobility model selector in a mobile station to select a new mobility model for the mobile station if a difference between the current location and the calculated location information is greater than a reference value; and
   storing the one or more mobility models used by the mobile stations in the mobile network, wherein
   each of the mobile stations manages location information updating by using the one or more mobility models stored in the mobile station, and
   the mobile network manages location information updating for the mobile stations based on the mobility models currently being used by respective mobile stations.

19. The system according to claim 1, wherein the predefined selection priority is set by a user of the mobile station or by analyzing history location updating records of the mobile station.

* * * * *